United States Patent
Walbeck et al.

(10) Patent No.: US 7,230,811 B2
(45) Date of Patent: *Jun. 12, 2007

(54) MODULAR POWER LINE NETWORK ADAPTER

(76) Inventors: Alan K. Walbeck, 11978 September Cove, Sandy, UT (US) 84092; Dan B. Haab, 948 S. 2350 E., Springville, UT (US) 84663; Kevin L. Hurst, 1163 W. 1670 North, Pleasant Grove, UT (US) 84062; Vaughn R. Staheli, 1439 S. 600 W., Payson, UT (US) 84651

( * ) Notice: Subject to any disclaimer, the term of this patent is extended or adjusted under 35 U.S.C. 154(b) by 520 days.

This patent is subject to a terminal disclaimer.

(21) Appl. No.: 10/863,578

(22) Filed: Jun. 8, 2004

(65) Prior Publication Data

US 2005/0063535 A1   Mar. 24, 2005

Related U.S. Application Data

(63) Continuation of application No. 09/902,454, filed on Jul. 10, 2001, now Pat. No. 6,747,859.

(60) Provisional application No. 60/217,364, filed on Jul. 11, 2000.

(51) Int. Cl.
*H02H 3/08* (2006.01)

(52) U.S. Cl. .................. 361/93.1; 361/117; 361/111

(58) Field of Classification Search .............. 361/93.1, 361/111, 117, 119, 115, 120
See application file for complete search history.

(56) References Cited

U.S. PATENT DOCUMENTS

| | | | |
|---|---|---|---|
| 4,475,209 A | 10/1984 | Udren | |
| 4,814,941 A | 3/1989 | Speet et al. | |
| 4,985,695 A | 1/1991 | Wilkinson et al. | |
| 5,115,368 A | 5/1992 | Smith | |
| 5,198,806 A | 3/1993 | Lord | |
| 5,347,167 A | 9/1994 | Singh | |
| 5,801,635 A | 9/1998 | Price | |
| 5,805,053 A | 9/1998 | Patel et al. | |
| 6,011,682 A | 1/2000 | Storey | |
| 6,055,435 A | 4/2000 | Smith et al. | |

(Continued)

FOREIGN PATENT DOCUMENTS

WO    WO 99/27614 A2    6/1999

(Continued)

*Primary Examiner*—Linh V. Nguyen
(74) *Attorney, Agent, or Firm*—Knobbe, Martens, Olson & Bear, LLP

(57) ABSTRACT

A modular feed-though adapter that allows an electrical connection to a power line network adapter without "using up" an electrical outlet is described. In one embodiment, the modular feed-through adapter also provides noise filtering to protect electrical equipment plugged into the feed-through outlet. The noise filtering also protects the power line network data signals from noise generated by the devices plugged into the feed-through adapter. In one embodiment, the network connections provided by the feed-through adapter are low voltage connections, thus allowing the network connections from the feed-through adapter to be safely plugged directly into low-voltage equipment such as computer network cards and the like. In one embodiment, the modular adapter includes a ball to couple network data signals to the power line.

7 Claims, 11 Drawing Sheets

U.S. PATENT DOCUMENTS

| | | | |
|---|---|---|---|
| 6,181,777 B1 * | 1/2001 | Kiko | 379/32.04 |
| 6,188,557 B1 | 2/2001 | Chaudhry | |
| 6,211,581 B1 | 4/2001 | Farrant | |
| 6,252,754 B1 | 6/2001 | Chaudhry | |
| 6,282,075 B1 | 8/2001 | Chaudhry | |
| 6,380,852 B1 | 4/2002 | Hartman et al. | |
| 6,396,673 B1 * | 5/2002 | Yancey et al. | 361/93.1 |
| 6,683,531 B2 * | 1/2004 | Diamanti et al. | 375/258 |
| 6,747,859 B2 * | 6/2004 | Walbeck et al. | 361/93.1 |
| 6,987,430 B2 * | 1/2006 | Wasaki et al. | 333/124 |
| 6,999,505 B2 * | 2/2006 | Yokoo et al. | 375/222 |
| 7,136,270 B2 * | 11/2006 | Liebenow | 361/118 |
| 2006/0050465 A1 * | 3/2006 | Cho et al. | 361/118 |

FOREIGN PATENT DOCUMENTS

WO   WO 01/43238 A1   6/2001

* cited by examiner

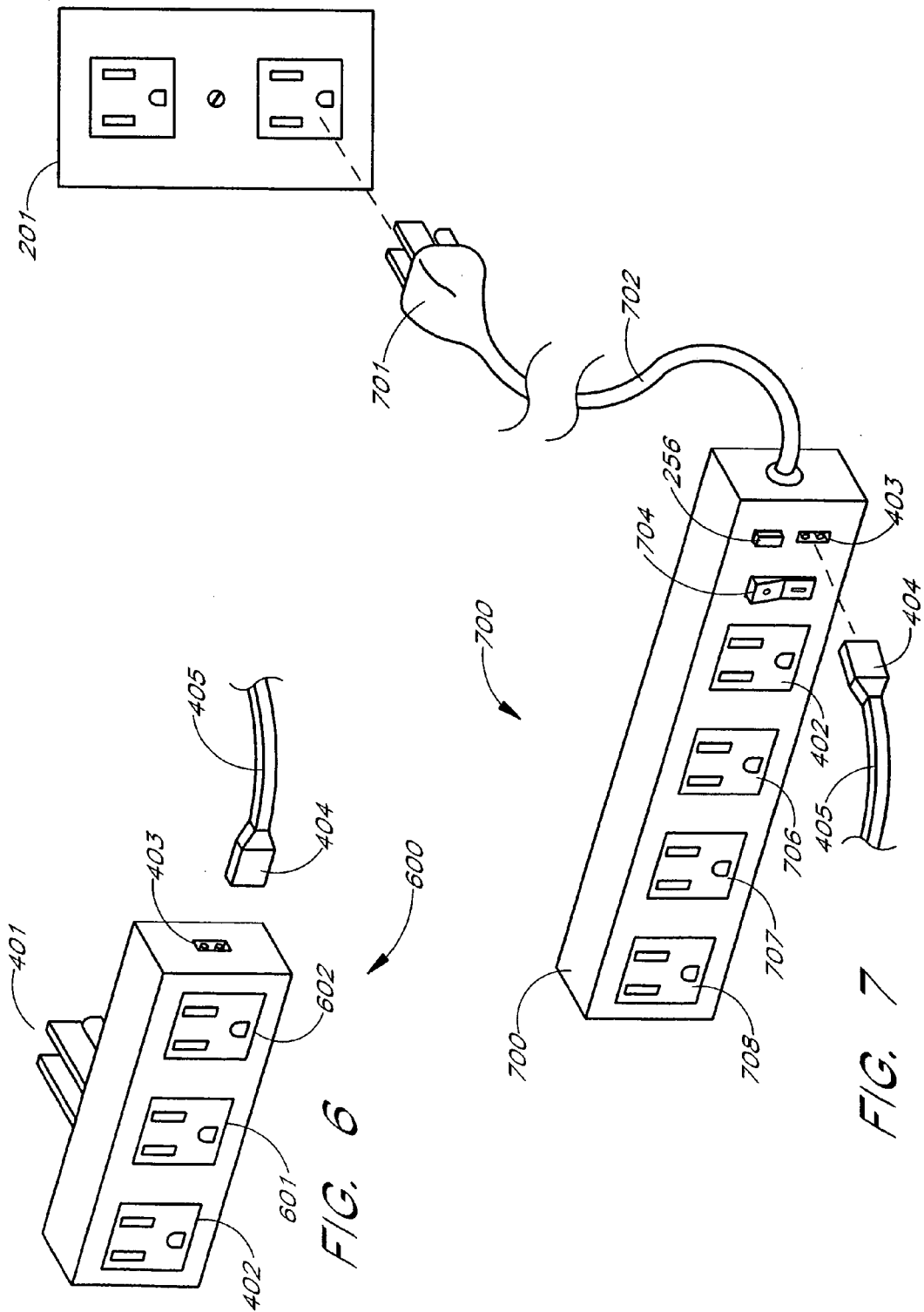

US 7,230,811 B2

MODULAR POWER LINE NETWORK ADAPTER

REFERENCE TO RELATED APPLICATIONS

This present application is a continuation of application Ser. No. 09/902,454, filed Jul. 10, 2001, U.S. Pat. No. 6,747,859, which claims priority from U.S. Provisional Application Ser. No. 60/217,364, filed Jul. 11, 2000, titled "MODULAR POWER LINE NETWORK ADAPTER," the entire contents of the above-listed applications are hereby incorporated by reference.

BACKGROUND OF THE INVENTION

1. Field of the Invention

The invention relates to adapters for power line communication systems, in particular, the invention relates to adapters that connect a power line network modem to an electrical outlet or electrical power cord.

2. Description of the Related Art

The widespread availability of computers, especially personal computers, has led to a rapid increase in the number of computer networks. Networking two or more computers together allows the computers to share information, file resources, printers, etc. Connecting two or more personal computers and printers together to form a network is, in principle, a simple task. The computers and printers are simply connected together using a cable, and the necessary software is installed onto the computers. In network terminology, the cable is the network medium and the computers and printers are the network nodes. Unfortunately, in practice, creating a computer network is often not quite as simple as it sounds. Typically, a user will encounter both software and hardware problems in attempting to configure a computer network.

When configuring a network in a home or small office, users often encounter hardware difficulties insomuch as it is usually necessary to install a network cable to connect the various network nodes. In a home or office environment, it can be very difficult to install the necessary cabling when the computers are located in different rooms or on different floors. Network systems that use radio or infrared radiation are known, but such systems are subject to interference and government regulation, and thus are far less common than systems that rely on a physical connection such as a wire or cable.

Virtually all residential and commercial buildings in the U.S. Are wired with electrical power lines, and using the existing power lines as a network medium to carry data is both convenient and efficient. Access to the power lines, for both power and data, is typically provided by conventional two-pronged or three-pronged electrical outlets. In most homes and office buildings, several electrical outlets are provided in each room. Nevertheless, many people find that there are never enough available outlets. To combat this problem, a wide variety of multi-outlet adapters have been marketed.

The multi-outlets adapters come in many forms, but they all have the common goal of expanding the number of devices that can be plugged into a wall outlet. One common type of multi-outlet adapter used with computer equipment is the surge-suppressor strip. The surge-suppressor strips usually include a power cord that plugs into an existing wall outlet, a switch, a circuit breaker, and several outlets. The surge-protector strips include surge suppressors and noise filters to protect the computer equipment from voltage spikes and noise often present on the power line.

Unfortunately, the surge suppressors and noise filters in the surge-suppressor strips often cause problems with power line networking systems because the noise filter treats the network data signals as noise that must be removed. Therefore, it is often desirable for the power line networking system to have direct access to the electrical power outlets, rather than the outlets provided by the surge-suppressor strip.

Power line network systems are often installed by homeowners and small business owners who have little, if any, technical training. Some users have encountered difficulty, and dissatisfaction, with prior power line network systems because the user, unwilling to give up an electrical outlet, plugged the power line equipment into a surge-suppressor strip (sometimes rendering the power line network equipment partially inoperative due to the noise filters in the strip). Moreover, previous embodiments of power line adapters have met with some consumer resistance because the need for direct access to the power outlet "used up" an outlet that the consumer wanted to use for other purposes. In some cases, the size existing power line equipment that plugged into an electrical outlet forced the user to move furniture away from the outlet (such situations can occur, for example, when the outlet being used for a computer or printer lies behind a desk or bookcase).

SUMMARY OF THE INVENTION

The present invention solves these and other problems by providing a compact modular feed-though adapter that allows an electrical connection to a power line network adapter without "using up" an electrical outlet. In so doing, the present invention greatly increases the convenience and usability of power line network equipment. Power line network equipment configured according to the present invention is much easier for the user to install than prior systems and significantly reduces the chance that a user will have problems due to incorrect installations. The feed-through adapter allows the user to plug the power line network adapter directly into the wall without sacrificing an electrical outlet.

In one embodiment, the modular feed-through adapter also provides noise filtering to protect electrical equipment plugged into the feed-through outlet. Unlike a conventional surge-suppressor strip that filters all outputs, putting the noise filter in the feed-through adapter provides filtering where desirable (e.g. To protect a computer) and avoids protective filtering where such filtering would be undesirable (e.g. In the power line network data path). The noise filtering also protects the power line network data signals from noise generated by the devices plugged into the feed-through adapter. In one embodiment, the network connections provided by the feed-through adapter are low voltage connections, thus allowing the network connections from the feed-through adapter to be safely plugged directly into low-voltage equipment such as computer network cards and the like.

One embodiment includes a self-contained feed-through power line network adapter that provides an electrical power connection to a power line, and a network data connection to a computer or other device. In one embodiment, the self-contained unit includes an electrical plug configured to plug into one socket, such as the lower socket, of an electrical power outlet without covering other sockets in the electrical outlet. The self-contained adapter includes a feed-through output socket and a network data/power connector. In one embodiment, the feed-through socket includes a filter to reduce the amount of power line noise and voltage spikes that reaches the equipment plugged into the feed-through socket. The filter also reduces the amount of noise that reaches the data/power connector from the device plugged into the feed-through outlet. In one embodiment, the self-contained network adapter includes a power line network interface and one or more network ports to allow network connections between the self-contained network adapter and a computer or other device.

In one embodiment, a self-contained adapter includes an electrical plug configured to plug into two or more sockets of an electrical power outlet. The two-outlet self-contained adapter includes two feed-through output sockets and a network data/power connector. In one embodiment, the feed-through socket includes a ground-fault interrupter circuit for safety and a filter to reduce the amount of power line noise and voltage spikes that reaches the equipment plugged into the feed-through sockets. The filter also reduces the amount of noise that reaches the data/power connector from the device plugged into the feed-through outlets.

In one embodiment, a modular feed-through power line network adapter provides an electrical power connection to a power line, and a power and data connection to a power line network adapter. The modular adapter provides a feed-through output socket and a power/network connector. In one embodiment, the feed-through socket includes a filter to reduce the amount of power line noise and other voltage transients that reach the equipment plugged into the feed-through socket. The filter also reduces the amount of noise that reaches the data/power connector from the device plugged into the feed-through outlet. In one embodiment, the data/power connector is configured to receive a data/power cable connected to a power line network adapter module. In one embodiment, the data/power connector provides 110-volt power to the network adapter module. In one embodiment, the data/power connector provides relatively lower voltage power to the network adapter module. In one embodiment, the data/power connector provides data signals to a self-powered the network adapter card or module. One embodiment includes a modular feed-through power line network adapter configured as a surge-suppressor strip that includes a network power/data connector.

One embodiment includes a modular feed-through power line network adapter that provides an inline electrical power connection to a computer power-supply connector plug and a data connection to a power line network adapter.

In one embodiment, a low pass filter reduces the amount of power line noise that reaches the device plugged into the feed-through outlet. The low pass filter also reduces the noise that reaches the data/power connector from a device plugged into a feed-through outlet. In one embodiment, the low pass filter is an LC filter.

In one embodiment, the modular adapter includes a ball to couple network data signals to the power line.

BRIEF DESCRIPTION OF THE DRAWINGS

These and other features of the invention will now be described with reference to the following drawings.

FIG. 6 shows one embodiment of a modular feed-through power line network adapter that provides a multi-output electrical power connection to a power line, and a data connection to a power line network adapter.

FIG. 7 shows one embodiment of a modular feed-through power line network surge-suppressor strip that provides a multi-output electrical power connection to a power line, and a data connection to a power line network adapter.

Figure 1:
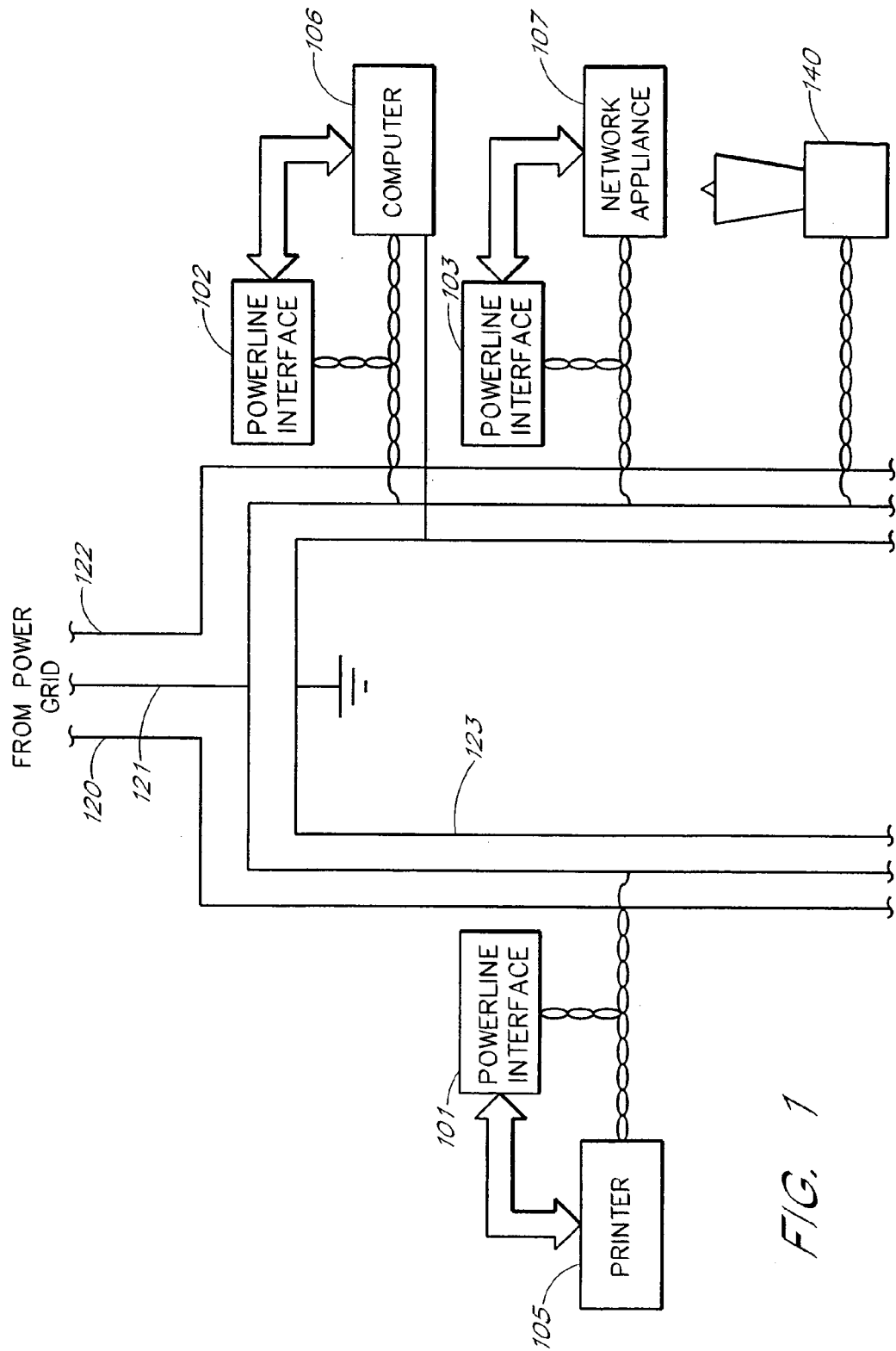
FIG. 1 is a schematic diagram of the electrical powerline wiring in a typical home or small office and a networking system that uses the electrical powerlines as the network medium.

In the drawings, like reference numbers are used to indicate like or functionally similar elements. The first digit of each three-digit reference number generally indicates the figure number in which the referenced item first appears. The first two digits of each four-digit reference number generally indicate the figure number in which the referenced item first appears.

DETAILED DESCRIPTION

FIG. 1 is a schematic diagram of the electrical powerline wiring in a typical home or small office and a networking system that uses the electrical powerlines as the network medium. Power is received from an external power grid on a first hot wire 120, a second hot wire 122, and a neutral wire 121. The hot wires 120 and 122 carry an alternating current at 60 Hz (hertz) at a voltage that is nominally 110 volts RMS with respect to the neutral wire 121. The hot wires 120 and 122 are 180 deg. out of phase with respect to each other, such that the voltage measured between the first hot wire 120 and the second hot wire 122 is 220 volts RMS.

Only one of the hot wires 120, 122 is provided to smaller appliances, lights, computers, etc. For example, as shown in FIG. 1, the second hot wire 122 and the neutral wire 121 are provided to a blender 140.

The first hot wire 120, the neutral wire 121, and a ground wire 123 are provided to a power input of a printer 105. The first hot wire 120 and the neutral wire 121 are also provided to a powerline data port of a powerline network module 101. A data port on the powerline network module 101 is provided to a data port on the printer 108.

The second hot wire 122, the neutral wire 121, and the ground wire 123 are provided to a power input of a computer 106. The second hot wire 122 and the neutral wire 121 are provided to a powerline data port of a powerline network module 102. A data port on the powerline network module 102 is provided to a network data port on the computer 106.

The second hot wire 122, the neutral wire 121, and the ground wire 123 are provided to a power input of a networked device 107. The second hot wire 122 and the neutral wire 121 are provided to a powerline data port of a powerline network module 103. A data port on the powerline network module 103 is provided to a network data port on the device 107. The device 107 can be any networked appliance or device in the home or office, including, for example, an alarm system controller, an alarm system sensor, a controllable light, a controllable outlet, a networked kitchen appliance, a networked audio system, a networked television or other audio-visual system, etc.

The printer 105, the computer 106, and the networked device 107 communicate using the electrical powerlines (the hot wires 120, 122, and the neutral wire 121). The powerline network modules 101–103 receive network data, modulate the data into a format suitable for the powerline, and couple the modulated data onto the powerline. The powerline network modules also receive modulated data from the powerlines, and demodulate the data.

Devices such as the blender 140 and the computer 106 introduce noise onto the powerlines. This noise includes motor noise, switching transients, etc. The network modules 101–103 are configured to provide an acceptable maximum data error rate in the presence of this noise.

Figure 2A:
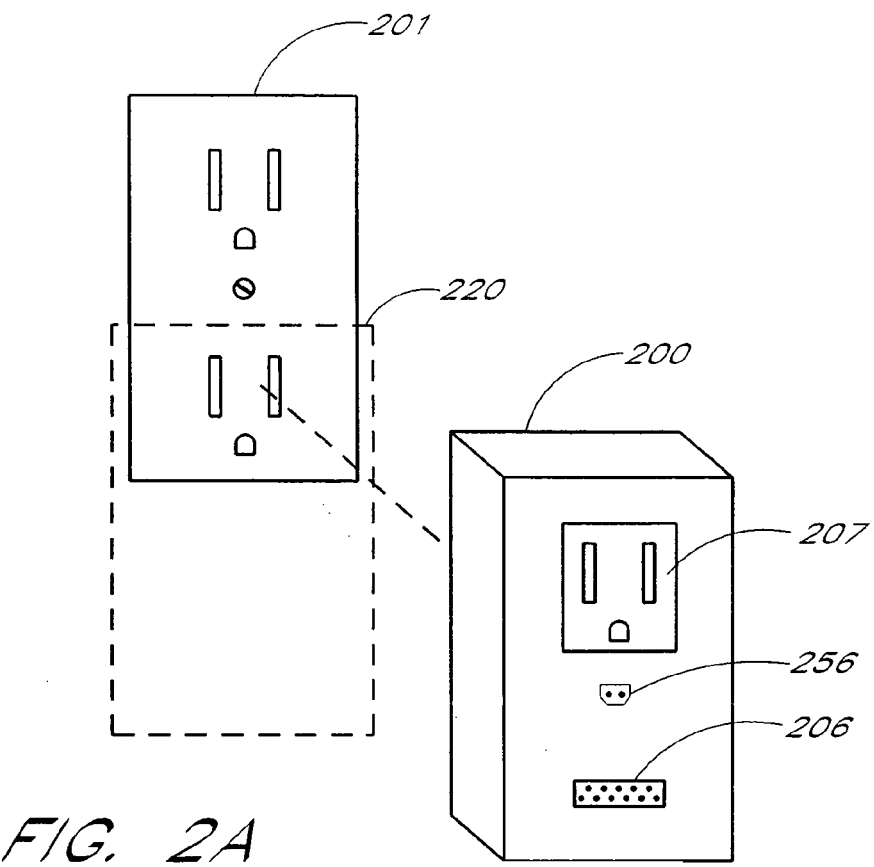
FIGS. 2A and B show one embodiment of a self-contained feed-through power line network adapter that provides an electrical power connection to a power line, and a network data connection to a computer or other device.
Figure 2B:
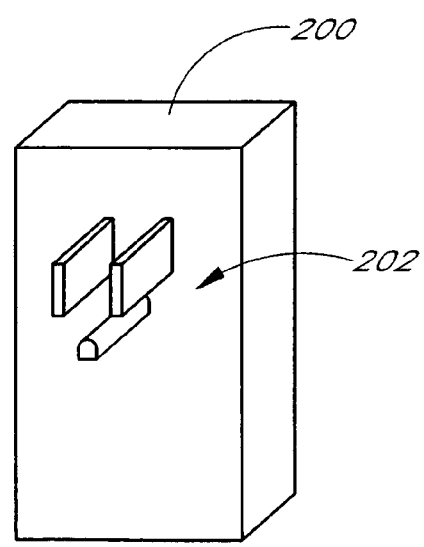

FIG. 2 shows one embodiment of a self-contained feed-through power line network adapter 200 that provides an electrical power connection to a power line, and a network data connection to a computer or other device without "using up" an electrical outlet. The adapter 200 includes a plug 202 and a feed-through outlet 207. In one embodiment, the plug 202 and the outlet 207 are three-pronged devices for connecting to hot, neutral, and ground. In one embodiment, the plug 202 and the outlet 207 are two-pronged devices for connecting to hot and neutral. The adapter 200 also includes computer data connectors such as a USB connector 256 and a parallel-port connector 206. The data connectors 256 and/or 206 can also be configured for Ethernet, firewire, fiber-optic cable, and the like. A computer, printer, appliance, or other network enabled device is connected by a network cable to the data connectors 256 and/or 206.

The adapter 200 is configured such that when the plug 202 is plugged into a standard wall outlet, the adapter 200 does not cover other sockets in the wall outlet (as shown by an outline 220). The adapter 200 includes internal electronic circuits that modulate data received at the connectors 256 or 206 and couple the modulated data onto the power line through the plug 202. The internal circuits also receive modulated data from the plug 202, demodulate the data, and provide the demodulated data to the connectors 256 and 206. As shown in connection with FIGS. 9–12 below, in one embodiment, a filter is provided between the feed-through outlet 207 and the internal electronic circuits to prevent noise introduced by a device plugged into the outlet 207 from reaching the internal circuits. Likewise, the filter keeps a portion of the noise and transients from the power line from reaching the outlet 207 and thus any devices plugged into the outlet 207 are thereby partially protected from power line noise and transients.

Figure 3A:
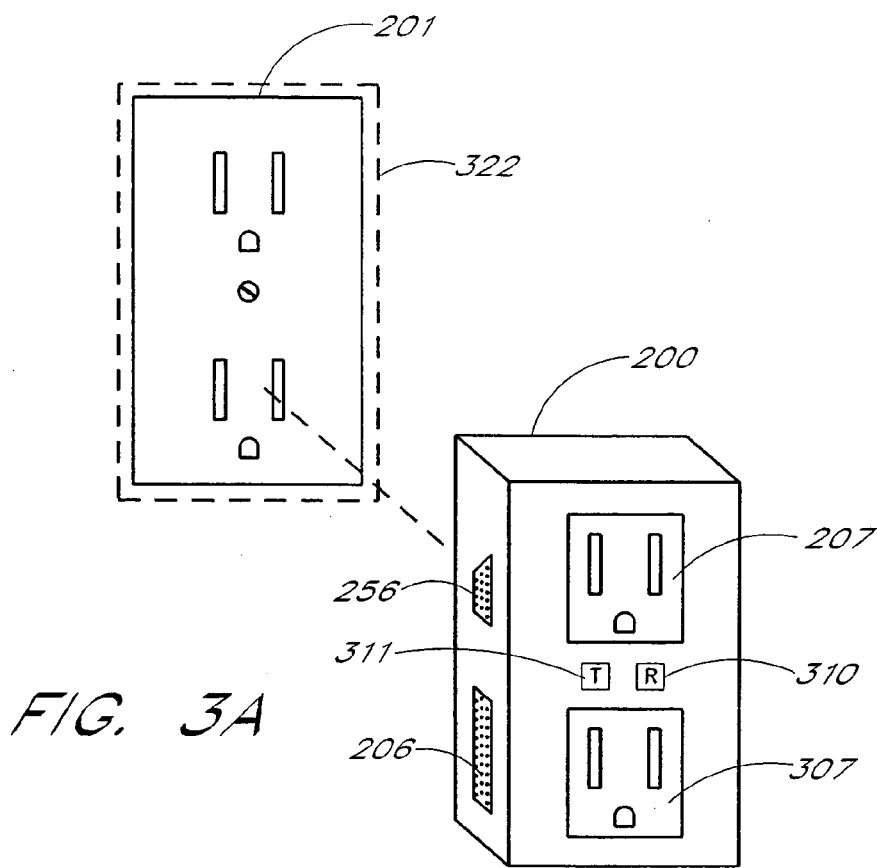
FIGS. 3A and B show one embodiment of a self-contained feed-through power line network adapter that provides a ground-fault protected electrical power connection to a power line, and a network data connection to a computer or other network device.
Figure 3B:
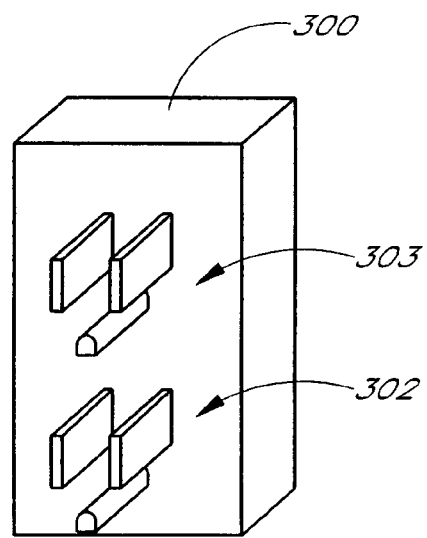

FIG. 3 shows one embodiment of a self-contained feed-through power line network adapter 300 that provides a ground-fault interrupter (GFI) protected electrical power connection to a power line, and a network data connection to a computer or other device without "using up" an electrical outlet. The adapter 300 includes three-pronged plugs 302 and 303. The adapter 300 includes GFI-protected feed-through outlets 307 and 308. A test button 311 and a reset button 310 are also provided to enable the conventional GFI test and reset functions. The adapter 300 also includes the computer data connectors 256 and 206.

The adapter 300 is configured such that when the plugs 302 and 303 are plugged into a standard wall outlet, the outlet becomes a ground-fault interrupter outlet. Like the adapter 200, the adapter 300 includes internal electronic circuits that modulate data received at the connectors 256 or 206 and couple the modulated data onto the power line through the plug (302 or 303). The internal circuits also receive modulated data from the plug (302 or 303), demodulate the data, and provide the demodulated data to the connectors 256 and 206. As shown in connection with FIGS. 9–12 below, in one embodiment, a filter is provided between the GFI-protected feed-through outlets 307 and 308 and the internal electronic circuits to prevent noise introduced by a device plugged into the outlets 307 and 308 from reaching the internal circuits. Likewise, the filter keeps a portion of the noise and transients from the power line from reaching the outlets 307 and 308 and thus any devices plugged into the outlets 307 and 308 are thereby partially protected from power line noise and transients. In one embodiment, a GFI circuit protects both the outlets 307, 308, the internal electronic network circuits (including the connectors 206, 256).

Figure 4:
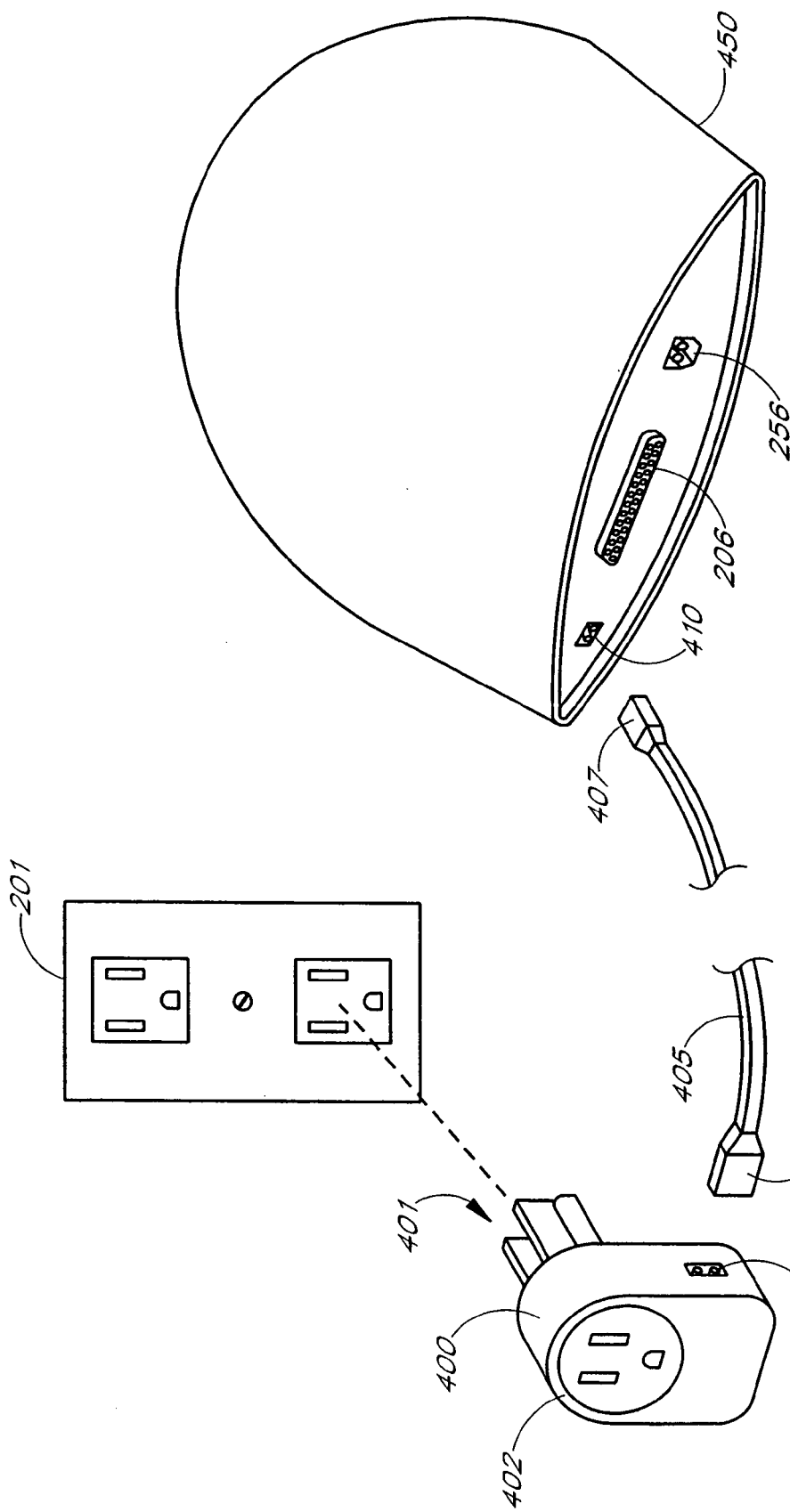
FIG. 4 shows one embodiment of a modular feed-through power line network adapter that provides an electrical power connection to a power line, and a power and data connection to a power line network adapter.

FIG. 4 shows one embodiment of a modular feed-through power line network adapter 400 that provides an electrical power connection to a power line, and a network power and/or data connection to a power line network modem 450 without "using up" an electrical outlet. The adapter 400 includes a plug 401 and a feed-through outlet 402. In one embodiment, the plug 401 and the outlet 402 are three-pronged devices for connecting to hot, neutral, and ground. In one embodiment, the plug 401 and the outlet 402 are two-pronged devices for connecting to hot and neutral. The adapter 400 also includes a connector 403 for providing power and/or data. An interface cable 405 is provided with a plug 404 on one end and a plug 407 on the other end. The plug 404 is provided to the connector 403 and the plug 407 is provided to a connector 410 on the modem 450, thus allowing power and/or data to flow between the adapter 400 and the modem 450.

The modem 450 includes internal circuits for modulating and demodulating data from the power line. The modem 450 also includes network interface connectors such as the connectors 206 and 256 as described in connection with FIG. 2 above. In one embodiment, the module 400 is configured such that when it is plugged into one socket of the standard wall outlet 201, it does not cover up the other socket(s) in the wall outlet 201. Internal circuitry of the adapter 400 is described in connection with FIG. 9–12.

The connectors 404 and/or 407 can be omitted and the cable 405 connected directly to the adapter 400 and/or the modem 450 respectively.

Figure 5:
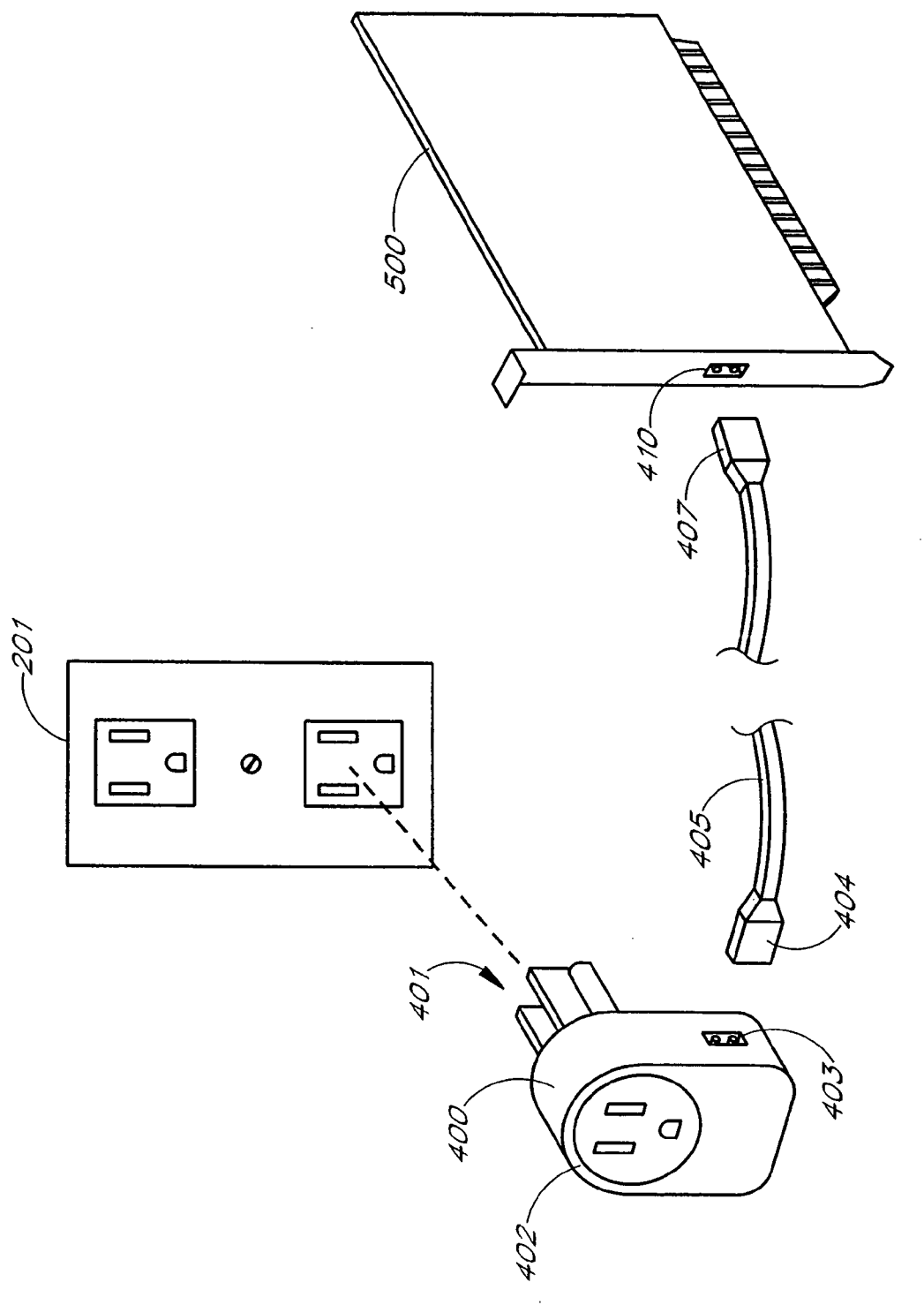
FIG. 5 shows one embodiment of a modular feed-through power line network adapter that provides an electrical power connection to a power line, and a data connection to a power line network adapter card.

As shown in FIG. 5, in one embodiment, the modular feed-through power line network adapter 400 and cable 405 can also be connected to a computer interface card 500. In one embodiment, the card 500 includes the connector 410 and the modulation and demodulation circuits described in connection with the modem 450 above. The card 500 can be a plug-in card such as for example a PCI card, an ISA card, a Macintosh plug-in card, a daughter board, etc. The card 500 can also be a computer motherboard, a device specific card such as a printer controller card, an appliance controller card, etc. The connector 404 and/or 407 can be omitted and the cable 405 connected directly to the adapter 400 and/or the card 500 respectively.

In one embodiment, the card 500 is configured to be self-powered (that is, powered by the computer or device it is connected to) and thus the adapter 400 does not need to supply power. In this embodiment, the cable 405 need only provide a data connection between the adapter 400 and the card 500 (see e.g. the embodiments shown in connection with FIG. 11 or 12).

FIG. 6 shows one embodiment of a modular feed-through power line network adapter 600 that provides a multi-output electrical power connection to a power line, and the data connector 403. The adapter 600 is similar to the adapter 400 and includes the plug 401, the outlet 402, and the connector 403. The adapter 600 also includes additional outlets 601 and 602.

FIG. 7 shows one embodiment of a modular feed-through power line network outlet strip 700 that provides a multi-output electrical power connection to a power line, and the data connector 403. The strip includes a plug 701 and a main power cable 702 (in lieu of the plug 401 shown in connection with FIG. 6). The strip 700 includes the outlets 402 and additional outlets 706–708. A switch 704 is provided to allow the outlets 401 and 706–708 to be disconnected from the electrical power supply. In one embodiment, the outlet strip 700 includes surge suppressors for one or more of the outlets 401 and 706–708.

In one embodiment, the strip 700 is configured as a self-contained outlet strip and network power adapter including the network data connector 256 and the modulation and demodulation circuits described in connection with the modem 450.

In one embodiment, the strip 700 is configured as an electrical power line adapter including the connector 403 to be used in connection with a modem, such as, for example, the modem 450 or the network card 500.

Figure 8:
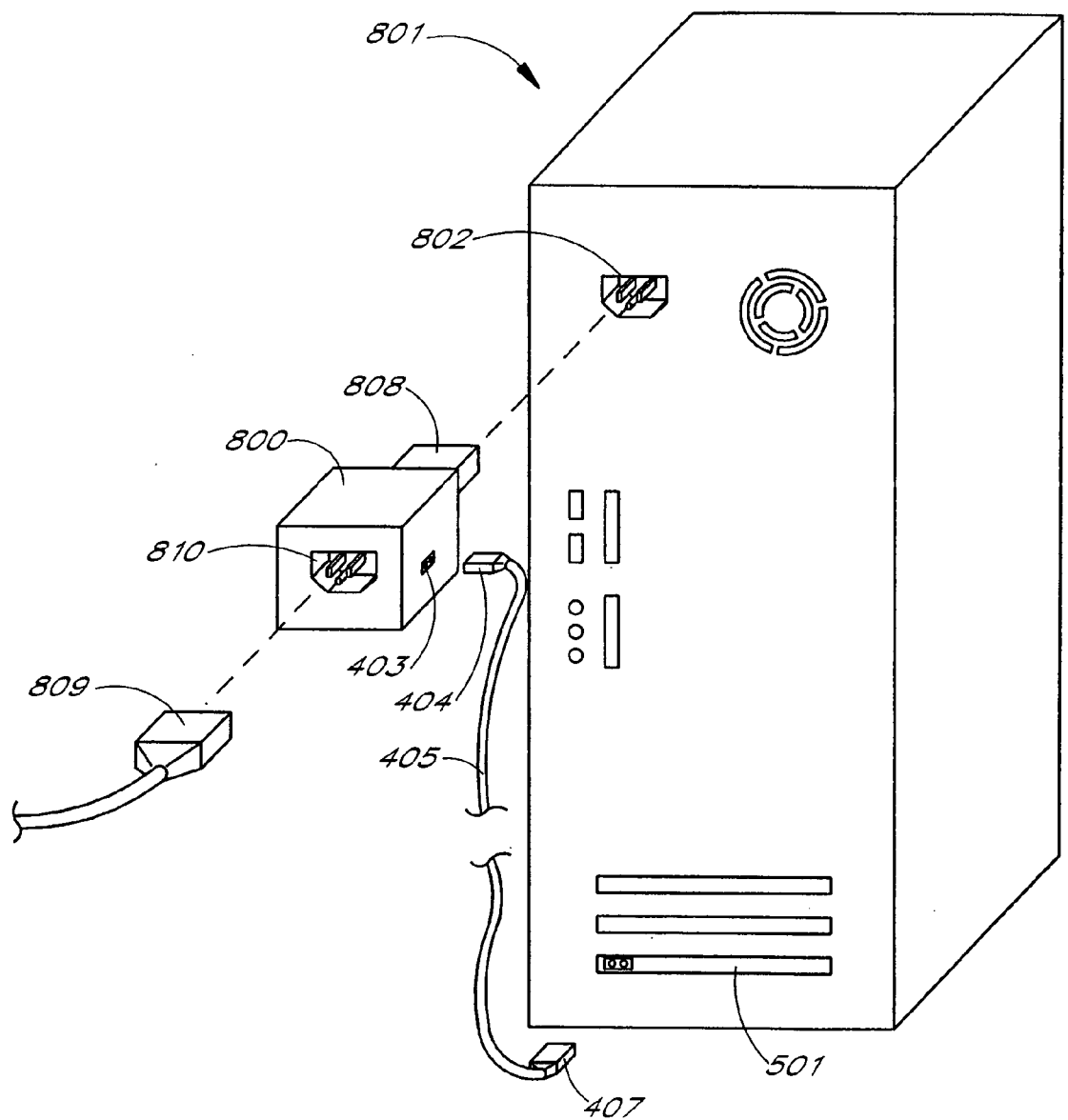
FIG. 8 shows one embodiment of a modular feed-through power line network adapter that provides an inline electrical power connection to a computer power-supply power line, and a data connection to a power line network adapter.

FIG. 8 shows one embodiment of a modular feed-through power line network adapter 800 that includes an electrical connector 808 configured to plug into a standard computer power-supply connector 802. The adapter 800 includes a standard computer power-supply connector 810 to allow a computer power cord 809 to be plugged into the adapter 800. The adapter 800 includes the connector 403 to allow a connection to the computer card 500 (or motherboard, etc.) as described in connection with FIG. 5 above. Electrically, the adapter 800 can be configured as shown in connection with FIGS. 9–12.

Figure 9:
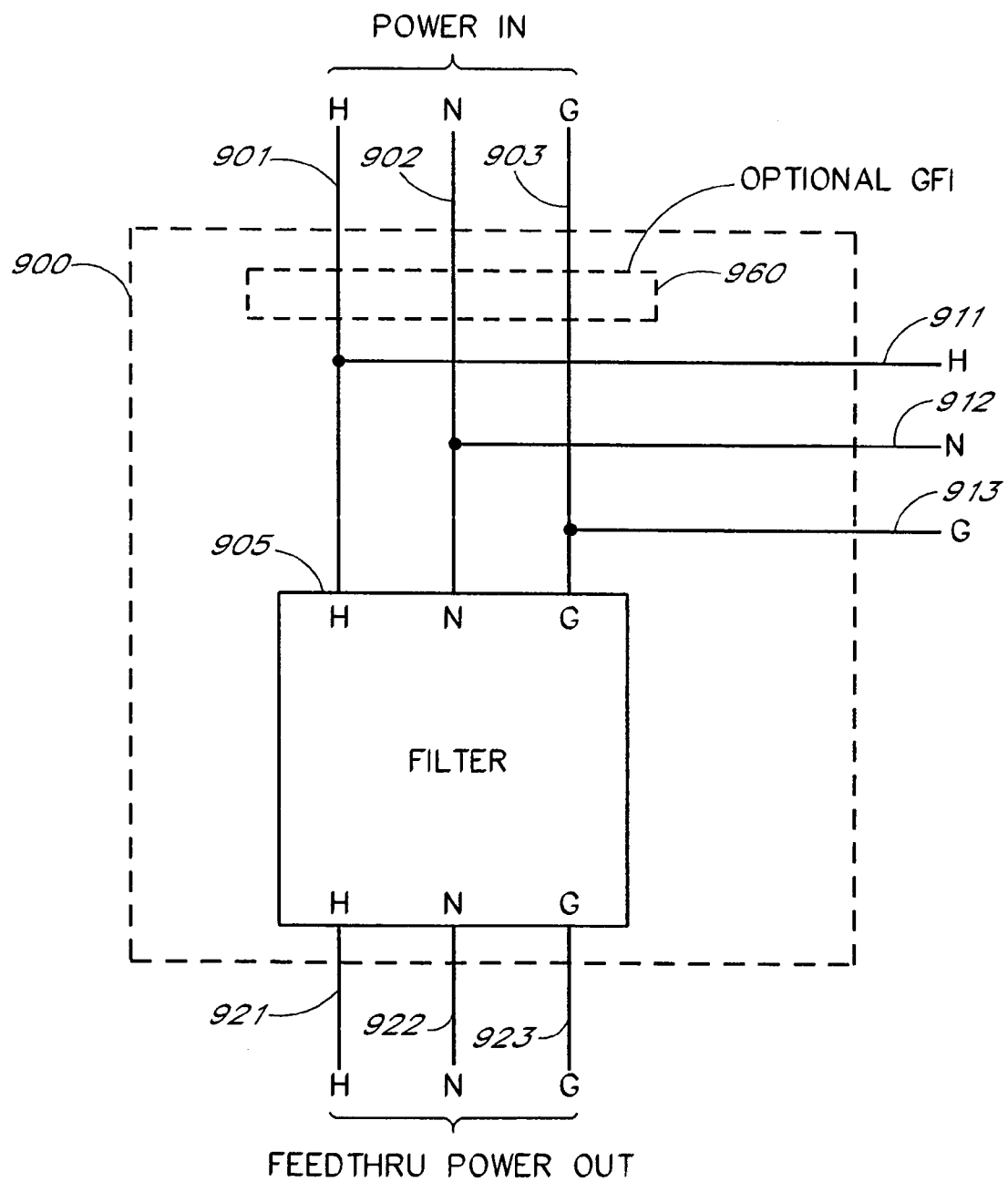
FIG. 9 is a block diagram of one embodiment of a feed-through power line network adapter that provides a filtered feed-through port for powering other electrical devices and an unfiltered output for providing power and data to a power line network interface.

FIG. 9 is a schematic diagram of one embodiment of a filtered feed-through adapter circuit 900. The circuit 900 is a representative embodiment of the adapters described above in connection with FIGS. 2–8. The adapter 900 receives power from a power line, such as, for example, the plug 202, 302, 303, 401, 701 and the like, including an input hot line 901, and input neutral line 902, and an input ground line 903 (the ground is optional in some embodiments). The hot line 901, the neutral line 902 and the ground line 903 are provided to a hot input, neutral input and ground input, respectively, of an optional GFI circuit 960. A hot output, a neutral output, and a ground output of the GFI circuit 960 are provided, respectively, to a hot input, a neutral input, and a ground input of a filter 905. If the GFI circuit 960 is omitted then the hot line 901, the neutral line 902 and the ground line 903 are provided to the hot input, the neutral input, and the ground input, respectively, of the filter 905. A hot output, a neutral output, and a ground output of the filter 905 are provided, respectively, to a hot feed-through output 921, a neutral feed-through output 922, and a ground feed-through output 923. The feed-through outputs 921–923 are provided to the feed-through output outlets such as, for example, the outlets 207, 307, 308, 402, 601–602, and 708-708 and the like.

The hot input, the neutral input, and the ground inputs of the filter 905 are also provided to a hot network output 911, a neutral network output 912, and an optional ground network output 913. In one embodiment, the network outputs 911–913 are provide to, for example, the connector 403 described above in connection with FIGS. 4-8. The filter 905 can be a lowpass filter or a bandpass filter. In one embodiment, the filter 905 includes surge suppressors. In one embodiment, the filter 905 includes surge suppressors to clamp transient high-voltage spikes to relatively safe levels. In one embodiment, the filter 905 includes inrush current limiters to limit high current surges.

Figure 10:
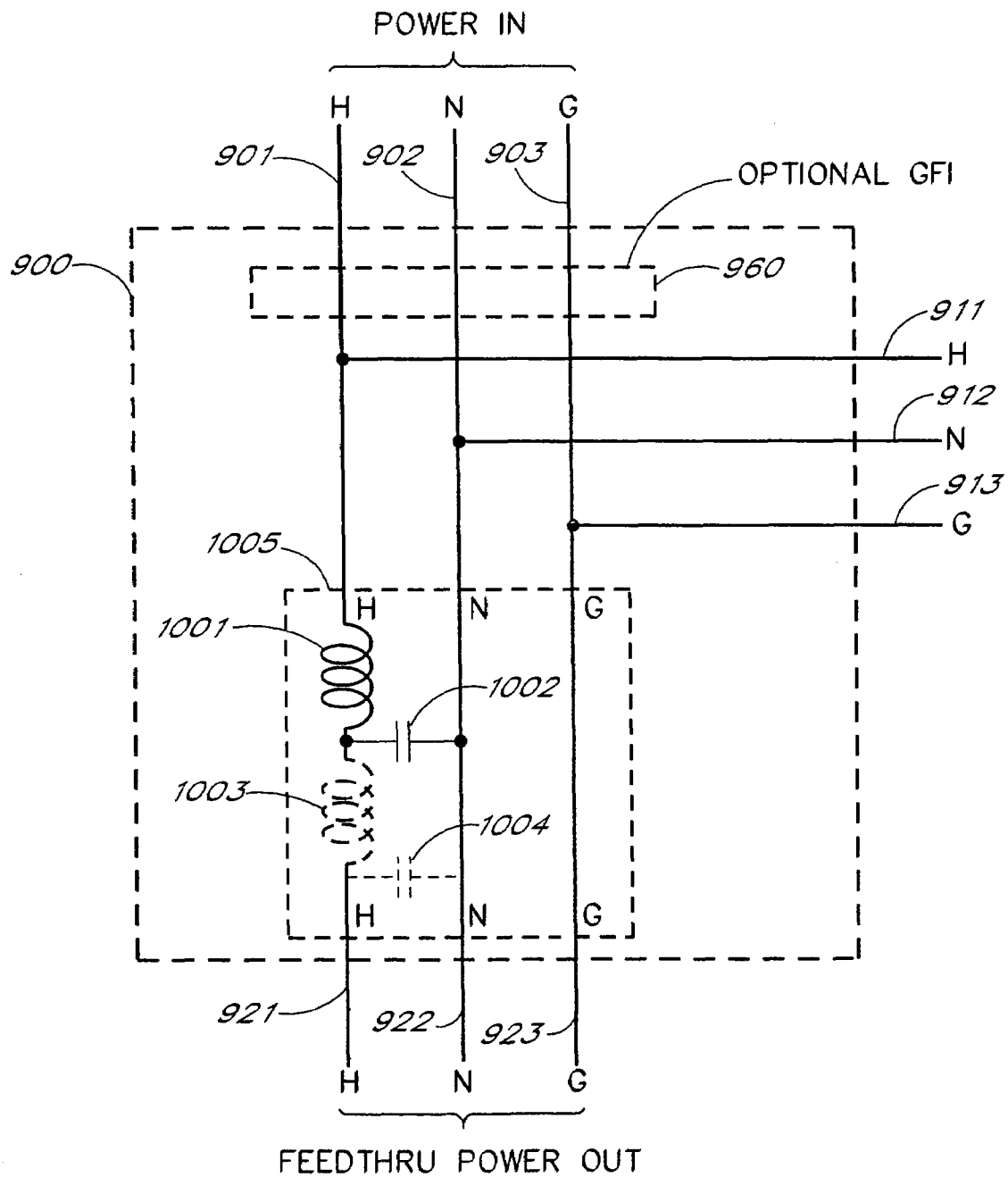
FIG. 10 is a block diagram of one embodiment of a filtered feed-through adapter as described in connection with FIG. 9.

FIG. 10 is a schematic diagram of one embodiment of the filter 905, shown as a filter 1005. In the filter 1005, the hot input is provided to a first terminal of an inductor 1001. A second terminal of the inductor 1001 is provided to a first terminal of a capacitor 1004 and to a first terminal of an optional inductor 1003. A second terminal of the capacitor 1002 is provided to the neutral input of the filter 1005. The second terminal of the inductor 1003 is provided to a hot output of the filter 1005 and to a first terminal of a capacitor 1004. A second terminal of the capacitor 1004 is provided to the second terminal of the capacitor 1002. The neutral input of the filter 1005 is provided to the neutral output of the filter 1005. The ground input of the filter 1005 is provided to the ground output of the filter 1005. The optional capacitor 1004 can be omitted. The optional inductor 1003 can be replaced with a wire.

Figure 11:
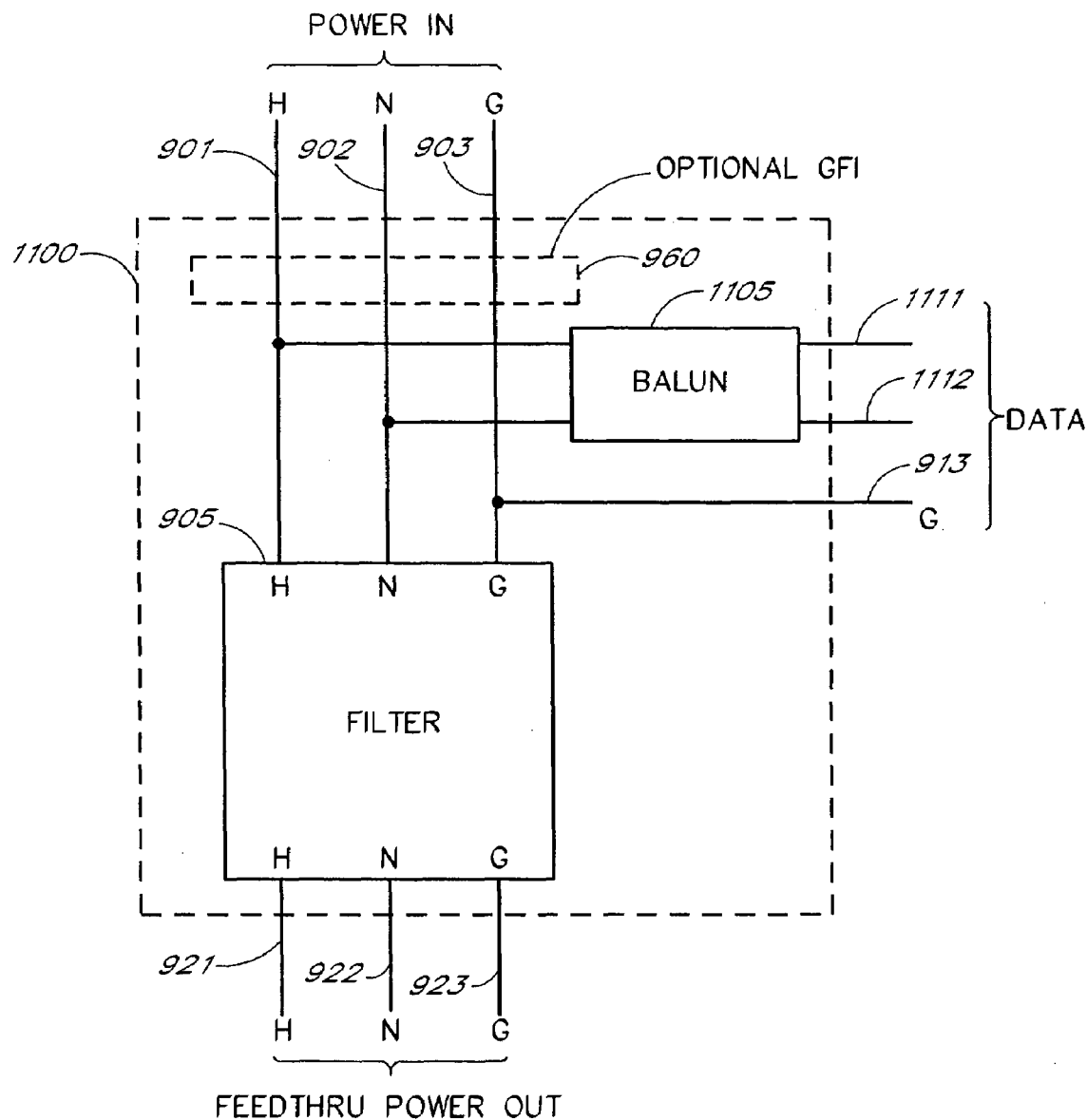
FIG. 11 is a block diagram of one embodiment of a feed-through power line network adapter that provides a filtered feed-through port for powering other electrical devices and a data output for providing data to a power line network interface, and, optionally, low voltage power to the power line network interface.

FIG. 11 is a schematic diagram of one embodiment of a filtered feed-through adapter circuit 1100. The circuit 1100 is a representative embodiment of the adapters described above on connection with FIGS. 2–8. The adapter 1100 is similar in many respects to the adapter 900 (shown in FIG. 9) and includes the inputs 901–903, the optional GFI 960, the filter 905, and the outputs 921–923. However, in the adapter 1100, the hot input and the neutral input of the filter 905 are provided to hot input and a neutral input of a ball 1105. The ground input of the filter 905 is provided to the ground output 913. A first ball outputs 1111 and a second ball output 1112 are provided to a data output, such as, for example, the connector 403 described above in connection with FIGS. 4–8. The ball separates the connector 403 from the high voltage power lines. In one embodiment, the ball 1105 extracts data signals from the power line and provides the data signals to the connector 403. In one embodiment, the ball is a step-down transformer that provides both data and low-voltage power signals to the data connector 403. One skilled in the art will recognize that the ball is typically bi-directional and the use of the terms input and output to describe the ports of the ball is for convenience, and not by way of limitation, such that the ball will also couple data from the lines 1111, 1112 onto the power lines 901, 902.

Figure 12:
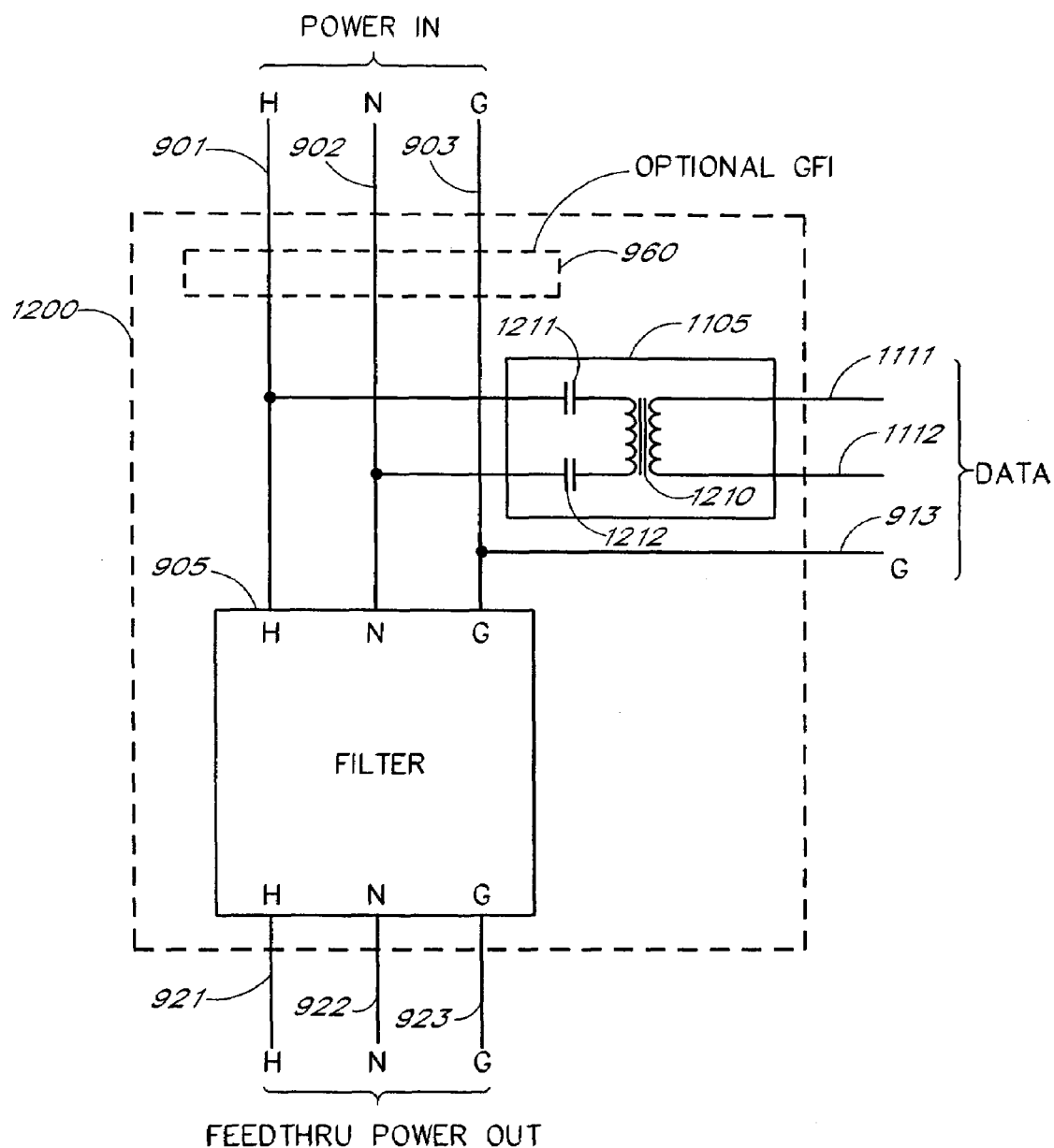
FIG. 12 is a block diagram of one embodiment of a feed-through power line network adapter that provides a filtered feed-through port for powering other electrical devices and a ball for providing data to a power line network interface.

FIG. 12 is a schematic diagram of a ball 1205, the ball 1205 being one embodiment of the ball 1105 shown in FIG. 11. In the ball 1205, the ball hot input is provided to a first terminal of a capacitor 1211 and the ball neutral input is provided to a first terminal of a capacitor 1212. A second terminal of the capacitor 1211 is provided to a first terminal of a primary winding of a ball transformer 1210. A second terminal of the capacitor 1212 is provided to a second terminal of the primary winding of a ball transformer 1210. A first terminal of a secondary winding of the ball transformer 1210 is provided to the output 1111 and a second terminal of the secondary winding of the ball transformer 1210 is provided to the output 1112.

In one embodiment, the ball transformer 1210 is a ferrite-core transformer. In one embodiment, the ball transformer 1210 is a powdered-metal core transformer.

Although this invention has been described in terms of a certain embodiment, other embodiments apparent to those of ordinary skill in the art also are within the scope of this invention. For example, the connectors 404 and/or 407 can be omitted and the cable 405 connected directly to the appropriate device. Various other changes and modifications may be made without departing from the spirit and scope of the invention. Accordingly, the scope of the invention is defined by the claims that follow.

What is claimed is:

1. A feed-through power line network adapter comprising:
   a housing;
   an electrical power plug attached to said housing for plugging into a standard electrical outlet;
   a surge suppressor in said housing, said surge suppressor configured to receive power from said electrical power plug;
   a first feed-through output socket configured to receive surge-suppressed power from said surge suppressor;
   a voltage step-down bandpass filter in said housing, said filter configured to receive power from said electrical power plug without passing through said surge suppressor;
   a network data/power connector attached to said housing, said connector configured to receive relatively low-voltage power from said filter; and
   a ground-fault interrupter circuit electrically interposed between said electrical power plug and said surge suppressor.

2. A feed-through power line network adapter comprising:
   an electrical power plug for plugging into a standard electrical outlet said electrical power plug comprising a housing;
   a filter in said housing, said filter configured to receive power from said electrical power plug;
   a first feed-through output socket disposed in said housing, said first feed-through output socket configured to receive power from said filter;
   a network connector configured to receive power from said electrical power plug without passing through said filter; and
   a ball in said housing, said ball configured to couple modulated data signals from said network connector to said electrical power plug.

3. A feed-through power line network adapter comprising:
   a housing;
   an electrical power plug attached to said housing for plugging into a standard electrical outlet;
   a filter in said housing, said filter configured to receive power from said electrical power plug;
   a first feed-through output socket attached to said housing, said first feed-through output socket configured to receive power from said filter;
   a data connector configured to receive power from said electrical power plug without passing through said filter; and
   a voltage step-down transformer in said housing, said step-down transformer having a high-voltage primary winding connected to said electrical power plug and a low-voltage secondary configured to provide power to said data connector.

4. The feed-through power line network adapter of claim 3, said filter composing a surge suppressor.

5. The feed-through power line network adapter of claim 3, said filter comprising a bandpass filter.

6. The feed-through power line network adapter of claim 3, said filter comprising a lowpass filter.

7. An inline-electrical power adapter, said adapter comprising:
   a first electrical connector, said first electrical connector configured to plug into a power connector of a standard computer power supply;
   a second electrical connector, said second electrical connector configured to receive a standard computer power cable connector;
   a filter disposed inside said adapter, said filter configured. To receive electrical power from said second electrical connector and provide filtered power to said first electrical connector;
   a ball provided to said adapter; and
   a data connector, said data connector configured to couple power line data network signals to said second electrical connector through said ball, said ball comprising a step-down transformer such that full power line voltages do not appear at terminals of said data connector.

* * * * *

UNITED STATES PATENT AND TRADEMARK OFFICE
CERTIFICATE OF CORRECTION

PATENT NO. : 7,230,811 B2
APPLICATION NO. : 10/863578
DATED : June 12, 2007
INVENTOR(S) : Walbeck et al.

It is certified that error appears in the above-identified patent and that said Letters Patent is hereby corrected as shown below:

In Column 1 at approximately line 49, change "Are" to --are--.

In Column 2 at line 49, change "To" to --to--.

In Column 2 at line 51, change "In" to --in--.

In Column 3 at line 55, change "ball" to --balun--.

In Column 4 at line 45, change "ball" to --balun--.

In Column 8 at line 55, change "ball" to --balun--.

In Column 8 at line 58, after first, change "ball" to --balun--.

In Column 8 at line 58, after second, change "ball" to --balun--.

In Column 8 at line 60, change "ball" to --balun--.

In Column 8 at line 61, change "ball" to --balun--.

In Column 8 at line 64, change "ball" to --balun--.

In Column 8 at line 66, change "ball" to --balun--.

In Column 9 at line 1, change "ball" to --balun--.

In Column 9 at line 2, change "ball" to --balun--.

In Column 9 at line 4, before 1205, change "ball" to --balun--.

In Column 9 at line 4, after the, change "ball" to --balun--.

In Column 9 at line 5, before 1105, change "ball" to --balun--.

In Column 9 at line 6, before 1205, change "ball" to --balun--.

In Column 9 at line 6, before hot, change "ball" to --balun--.

In Column 9 at line 7, before neutral, change "ball" to --balun--.

In Column 9 at line 10, change "ball" to --balun--.

UNITED STATES PATENT AND TRADEMARK OFFICE
CERTIFICATE OF CORRECTION

PATENT NO. : 7,230,811 B2
APPLICATION NO. : 10/863578
DATED : June 12, 2007
INVENTOR(S) : Walbeck et al.

It is certified that error appears in the above-identified patent and that said Letters Patent is hereby corrected as shown below:

In Column 9 at line 12, change "ball" to --balun--.

In Column 9 at line 13, change "ball" to --balun--.

In Column 9 at line 15, change "ball" to --balun--.

In Column 9 at line 17, change "ball" to --balun--.

In Column 9 at line 18, change "ball" to --balun--.

In Column 10 at line 7, in Claim 2, before in, change "ball" to --balun--.

In Column 10 at line 7, in Claim 2, before configured, change "ball" to --balun--.

In Column 10 at line 29, in Claim 4, change "composing" to --comprising--.

In Column 10 at approximately line 43-44, in Claim 7, after configured, change ". To" to --to--.

In Column 10 at line 47, in Claim 7, change "ball" to --balun--.

In Column 10 at line 50, after through said, change "ball" to --balun--.

In Column 10 at line 50, before comprising, change "ball" to --balun--.

Signed and Sealed this

Twenty-ninth Day of April, 2008

JON W. DUDAS
*Director of the United States Patent and Trademark Office*